Patented Aug. 17, 1954

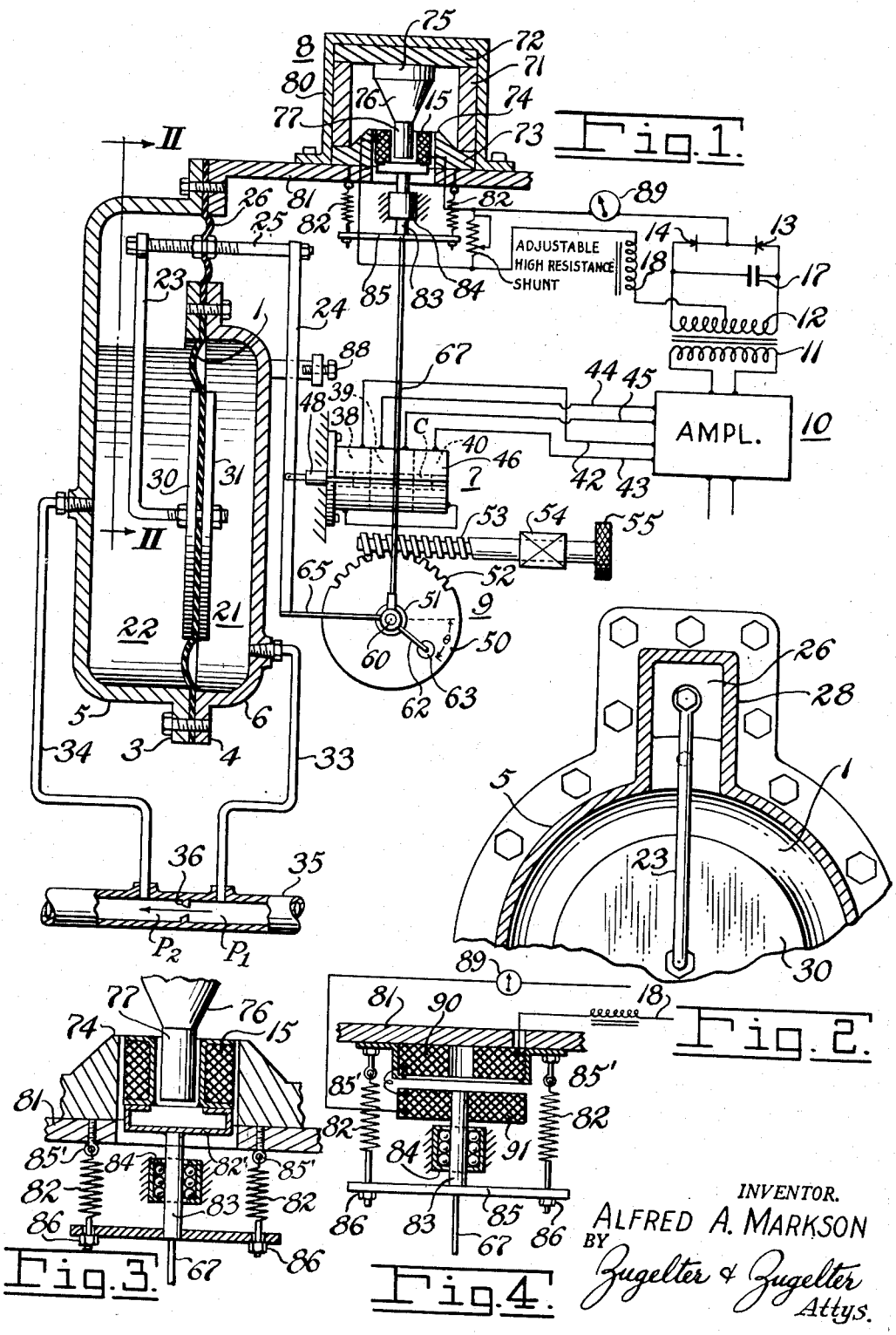

2,686,893

UNITED STATES PATENT OFFICE 2,686,893

ADJUSTABLE FOLLOW BACK IN PRESSURE RESPONSIVE REBALANCEABLE SYSTEM

Alfred A. Markson, Mount Lebanon Township, Allegheny County, Pa., assignor to Hagan Corporation, Pittsburgh, Pa., a corporation of Pennsylvania Application November 16, 1950, Serial No. 196,031

12 Claims. (Cl. 318—22)

This invention relates to regulators and more particularly to regulators provided with means responsive to an input signal or pressure for producing an electric output that is proportional to a function of the input, which function may be either linear or exponential, and with means whereby the ratio of the input to the output may be adjusted at will.

An object of this invention is to provide an adjustable ratio regulator having a pressure deflectable member such as a diaphragm or bellows that is responsive to a variable pressure or pressure difference, means responsive to the deflection of the pressure responsive member for developing an electric output and developing force that balances the force of the pressure responsive member, and means for adjusting the ratio of the variable pressure to the electric output.

Another object of the invention is to provide an adjustable ratio regulator of the type referred to above, in which the electric output may vary linearly with the magnitude of the pressure acting on the pressure deflectable member, or which may vary as an exponential function of that pressure.

The above and other objects of the invention will in part be apparent and will in part be obvious from the following description taken in conjunction with the accompanying drawings in which:

Figure 1 is a more or less diagrammatic view in section of an adjustable ratio regulator embodying a form of the invention;

Fig. 2 is a partial view in section taken on line II—II of Fig. 1;

Fig. 3 is an enlarged view in section of an electro-magnetic balancing device embodied in the regulator of Fig. 1; and Fig. 4 is a view in section of a modified form of electro-magnetic balancing device that may be utilized in the regulator of Fig. 1 in lieu of the device shown in Figs. 1 and 3 where it is desired that the electric output shall vary as the square root of the pressure difference to which the regulator responds.

In Fig. 1 of the drawings is illustrated a regulator having a pressure deflectable member 1, such as a diaphragm whose marginal edge is clamped between flanges 3 and 4 of housings 5 and 6, respectively, a differential transformer 7, an electro-magnetic balancing device 8, and an adjustable force transmitting mechanism 9. Device 8 is disclosed in my co-pending application Serial No. 184,569 filed September 13, 1950, and assigned to Hagan Corporation, Pittsburgh, Pennsylvania.

As will be explained infra, movement of the diaphragm 1 actuates a movable core C in the differential transformer 7 causing the output thereof to vary with the position of the core in the transformer. The output of the transformer is amplified by an amplifier 10.

Since the output of the amplifier is alternating, the amplifier output is delivered to the primary winding 11 of a transformer having a secondary winding 12. The output of the secondary winding 12 is rectified full wave by rectifiers 13 and 14. A coil winding 15 of the electro-magnetic balancing device 8 is energized by the output of the rectifier, one terminal of winding 15 being connected to the output terminal of rectifiers 13 and 14 as shown, and the other terminal being connected to the mid tap of winding 12. In order that the output of the rectifier may be smooth and steady, a condenser 17 and an impedance or choke 18 are provided and connected as shown.

If a pressure differential $(P_1-P_2)$ is acting on the diaphragm 1 and assuming that the pressures $P_1$ and $P_2$ act in chambers 21 and 22, respectively, the diaphragm moves to the left, as seen in Fig. 1. This movement is communicated to the core of transformer 7 by parallel levers 23 and 24 which are connected by a link or bolt 25 to a flexible pivot 26, which also serves as a pressure seal, as will be explained later.

Motion of the diaphragm 1 as above stated, causes the output of transformer 7 to vary between zero and a maximum value. The amplified and rectified output of transformer 7 energizes coil winding 15 causing it to develop a force that varies as a linear function of $(P_1-P_2)$ and consequently of the output of transformer 7. This force acts through the ratio mechanism 9 on levers 23 and 24 on diaphragm 1 in a direction to oppose the force of the differential $(P_1-P_2)$, acting on the diaphragm. For each value of the pressure difference $(P_1-P_2)$ there will be a definite value of opposing and balancing force developed by device 8.

As shown more particularly in Fig. 2, housing 5 has a flanged extension 28 in one side thereof through which lever 23 may pass. The sealing diaphragm 26 is secured to the opening into extension 28 so that chamber 22 is sealed from the atmosphere and made pressure-tight. Diaphragm 26 not only seals chamber 22, but also provides a substantially frictionless fulcrum for the lever system comprising levers 23 and 24 and the connecting link or strut 25. The inner end of the lever 23 is secured to plates 30 and 31, between which the central portion of diaphragm 1 is clamped.

Pressures $P_1$ and $P_2$ may be communicated to chambers 21 and 22 by means of pipes 33 and 34. If the pressure ($P_1-P_2$) is to be derived from the flow of a medium such as fluid, flowing in a pipe line 35, pipes 33 and 34 are connected to the interior of the pipe line on the upstream and downstream sides, respectively, of an orifice or restriction 36.

Lever 24 is connected to core C of the differential transformer 7. It is also connected to the ratio adjusting mechanism 9. Transformer 7 is shown and described in my aforementioned copending application Serial No. 184,569. The differential transformer comprises the core C and coil windings 38, 39 and 40 disposed in tandem or in co-axial relationship. Windings 38 and 40 are connected in series but differentially, to the input conductors 42 and 43, from the amplifier 10. Output winding 39 is connected to the amplifier by conductors 44 and 45. The coil windings may be disposed in a split sleeve 46 of magnetic material which forms the stationary core of the transformer.

When core C is in a neutral or zero output voltage position, the core extends equally, inductively speaking, into windings 38 and 40. When the core is out of neutral position the output voltage will be proportional to the difference between the inductions of windings 38 and 40. Core C is connected to beam 24 by a connecting member 48 of non-magnetic material.

The linkage 9 comprises a rotatable member such as a wheel 50 mounted on a shaft 51. The wheel 50 is provided with worm teeth 52 that mesh with a worm 53 whose shaft is journaled in a bearing 54. The worm is provided with a hand wheel 55 by means of which worm wheel 50 may be rotated clockwise or anti-clockwise on shaft 51. Wheel 50, coil winding 15 of device 8, and lever 24 are connected to a common pivot pin 60 which is located on the center line or major axis of the shaft 51. Wheel 50 is connected to pin 60 by a link 62, the link being connected by a pivot pin 63 that is journaled in the wheel. Beam 24 is connected by a relatively rigid link 65 to pin 60 and coil winding 15 is connected thereto by a link 67.

By rotating wheel 50 about its shaft 51 the angle $\theta$ between link 62 and link 65 projected may be adjusted. By adjusting this angle the component of the force developed by coil winding 15 that opposes the force exerted by ($P_1-P_2$) on diaphragm 1, may be caused to vary as the tangent of angle $\theta$. The opposing component of the force developed by coil winding 15 is a minimum when angle $\theta$ is zero. The adjustable force transmitting linkage 9 just described is disclosed in R. R. Donaldson Patent No. 2,352,312, granted June 27, 1944.

The electro-magnetic device 8, as shown in Fig. 1, includes the coil winding 15 and a relatively strong permanent magnet assembly, that is, a magnet that has a strong constant magnetic field. The permanent magnet comprises a cylindrical member 71 which is closed at its upper end by a plate 72 and at its lower end by a pole piece 73. The piece has a circular aperture 74 of a size to accommodate coil winding 15. The permanent magnet also includes a central core member 75 that is secured to end plate 72. Core member 75 has a frusto conical section 76 that terminates in a cylindrical section 77 extending into coil winding 15. The permanent magnet may be housed in a case 80 and mounted on a support plate 81 forming part of the regulator frame.

When current flows in coil winding 15, an upwardly acting force is exerted on the winding that is proportional to the value of the ampere turns at any instant. In order to limit the downward motion or movement of coil kinding 15 and also support the dead weight of the coil 15 and its linkage, the coil winding is supported by coil springs 82.

As shown, a frame 82' is secured to the bottom of coil winding 15. A guide rod 83 is secured to and depends from frame 82' and is guided in a stationary vertical anti-friction bearing 84. A transverse member 85 is secured to rod 83 at a point below bearing 84 and to which the lower ends of coil springs 82 are secured, one on each side of guide rod 83. The upper ends of springs 82 are attached to eye bolts 85' secured to frame 81. The lower ends of springs 82 may be threaded and fitted with nuts 86 to provide for vertical adjustment of the zero position of coil 15 when it is de-energized. As shown, ratio adjusting link 67 is secured to the lower end of guide rod 83.

In order that the output of differential transformer 7 shall always vary between zero and one maximum value as the pressure differential varies between zero and a maximum value, a stop 88 is provided and so adjusted that lever 24 and the core 37 actuated thereby can only move to the left, as seen in Figure 1, from zero induction position to a position in which the induction of winding 38 is predominant. It will be apparent that if the core were free to move to the right beyond the neutral induction position, coil winding 15 would exert a force that would be additive to the force developed by diaphragm 1; therefore, under such conditions the force of coil 15 and diaphragm 1 could not be balanced, as they would not oppose each other. The output supplied to coil winding 15 may be indicated by a meter 89, or it may be delivered to regulating apparatus to perform the regulating functions described in the R. R. Donaldson patent, supra.

If it be desired that the component of the force which opposes and balances the force developed by diaphragm 1 shall vary as an exponential function of the pressure difference ($P_1-P_2$), an electro-magnetic device such as shown in Fig. 4 may be substituted for device 8 of Fig. 1. The balancing device shown in Fig. 4 develops a total force whose magnitude is proportional to the square root of the pressure difference ($P_1-P_2$) the opposing component of which is linearly proportional to ($P_1-P_2$). Therefore, when the arrangement of Fig. 4 is employed, the output of transformer 7 will be linearly proportional to the flow in pipe 35, whereas, when coil 15 and the permanent magnet of Fig. 1 are employed, the output of transformer 7 varies as the square of the flow in pipe 35.

The balancing device shown in Fig. 4 comprises two flat or pan cake type coil windings 90 and 91, one of which is stationary and the other movable. As illustrated, winding 90 is the stationary winding, and is secured to the underside of frame member 81. Winding 91 is disposed below winding 90 and may be mounted on springs 82 and connected to link 67 in the same manner that coil 15 is supported and connected to link 67. Coil winding 91 may also be provided with a guide rod 83 and a vertical guide bearing 84. Windings 90 and 91 may each have a relatively large number of turns so that the force developed by the interaction of the magnetic fields thereof will be of the required magnitude to balance the force acting on diaphragm 1.

Windings 90 and 91 are connected in series; therefore, the force developed by coil 90 and acting along link 67 will vary as the square of the current traversing the same. The value of current flow in windings 90 and 91 of Fig. 4 that is required to balance a given pressure difference $(P_1-P_2)$ will be proportional to the square root of $(P_1-P_2)$. Therefore, the value of the current in windings 90 and 91 will be linearly proportional to the flow in pipe 35 that produces the pressure difference $(P_1-P_2)$.

From the foregoing, it will be apparent to those skilled in this art, that various modifications and changes may be made in the illustrated embodiments of the invention without departing from either the spirit or the scope thereof.

Therefore, what is claimed as new and desired to be secured by Letters Patent is:

1. An adjustable ratio regulator comprising a housing having therein a pressure deflectable member adapted to deflect in response to an applied pressure differential, a lever system connected to said deflectable member, a differential transformer comprising differentially connected windings and another winding inductively coupled thereto, a core movable in said windings between zero and one maximum position and disposed to be actuated by said lever system whereby the alternating voltage output of said transformer varies over a range between zero and one maximum value in accordance with the differential induction of said differential windings, electromagnetic means responsive to the differential output of said transformer for developing a force that is a function of said transformer output, and an adjustable force transmitting mechanism connecting said electro-magnetic output responsive means to said lever system in force opposing relation to each other, the force of said output responsive means opposing and balancing the force exerted by said deflectable member in response to said applied pressure differential, said adjustable force transmitting mechanism being adapted to adjust the ratio between said pressure differential and said electric output.

2. A regulator according to claim 1, characterized by the fact that the differential transformer comprises three coil windings disposed end to end, the terminal windings being differentially connected in series, a core in said windings movable axially thereof whereby when an alternating voltage input is impressed on either the middle winding or the differentially connected windings and the core is in neutral position the output voltage from the other winding or windings is zero and as said core is moved from neutral out of the field of one end winding into the field of the other the voltage output is proportional to the difference between the opposed voltages induced in said end windings, and means for limiting movement of said core between said neutral position and a position corresponding to the maximum induction of one of said terminal windings.

3. A regulator according to claim 1, characterized by the fact that the adjustable force transmitting mechanism between said lever system and said transformer output responsive means comprises a member provided with a fixed bearing, means for rotating said member about said bearing, a pair of links having adjacent ends connected together at a point coinciding with the axis of rotation of said rotatable member, the end of one link opposite said center of rotation being journaled in said rotatable member at a point removed from said center of rotation and the end of the other link opposite said center being connected to said lever system, and a link connected to the junction of said links at said center and to said transformer output responsive means, whereby the force exerted by said voltage output responsive means on said lever system is a function of the angle between said rotatable link and one of the other links.

4. A regulator according to claim 1, characterized by the fact that the adjustable force transmitting mechanism between said lever system and said transformer output responsive means comprises a member provided with a fixed bearing, means for rotating said member about said bearing, three links having adjacent ends connected together at a point coinciding with the axis of rotation of said rotatable member, the end of one of said links being journaled in said rotatable member at a point removed from said center of rotation and the ends of the other links being connected to said lever system and to said transformer output responsive means, respectively, the angle between the line of action of the link connected to said output responsive means and the line of action of the link connected between the common joint of said links and said lever system is substantially 90°, the other link being rotatable through an angle of substantially 90° the quadrant of said angle being opposite the quadrant containing the first mentioned 90° angle, whereby the force exerted by said voltage output responsive means on said lever system is a function of the angle between the rotatable link and one of the other of said links.

5. A regulator according to claim 1, characterized by the fact that the voltage output responsive means comprises a magnetic core and a coil winding movable relative thereto, one of which is connected to said adjustable force transmitting mechanism, the coil winding being connected to the output circuit of said differential transformer.

6. A regulator according to claim 1, characterized by the fact that the voltage output responsive means comprises a permanent magnet having an air gap and that the coil is movable and disposed in the gap, that the coil is connected by a tension link to said adjustable force transmitting mechanism, the coil winding being connected to and energized by the output of said transformer and exerting a force that is a linear function of said pressure differential.

7. A regulator according to claim 1, characterized by the fact that means are provided for amplifying said transformer output and that the output responsive means comprises a magnetic core and a coil winding movable relative thereto, one of which is connected to said adjustable force transmitting mechanism, the coil winding being connected to the output circuit of said differential transformer.

8. A regulator according to claim 1, characterized by the fact that means are provided for amplifying and rectifying said voltage output and that the voltage output responsive means comprises a permanent magnet having an air gap and that the coil is movable in the gap, and that the coil is connected by a link to said adjustable force transmitting mechanism, the coil winding being connected to and energized by the output of said transformer and exerting a force that is a linear function of the pressure differential imposed on said deflectable member.

9. A regulator according to claim 1, characterized by the fact that means are provided for amplifying and rectifying said voltage output and that the voltage output responsive means comprises series-connected stationary and movable coil windings, a yieldable support for said movable coil winding, said movable coil winding being connected to said adjustable force transmitting mechanism, said coil windings being connected to and energized by the rectified transformer output, whereby the balancing force developed by said windings varies as the square of the current flowing therein.

10. A regulator according to claim 1, characterized by the fact that means are provided for amplifying and rectifying said voltage output that the voltage responsive means comprises means adapted to develop a force that varies as the square of the output of the differential transformer, and that means are provided for applying said force to said adjustable force transmitting mechanism in opposition to the force applied thereto by said pressure deflectable member.

11. A regulator according to claim 1, characterized by the fact that the output responsive means comprises a permanent magnet and a coil winding movable in the field thereof, and that the coil winding is provided with a resilient support disposed to carry the weight of the coil winding and the parts by which it is connected to said adjustable force transmitting mechanism.

12. A regulator according to claim 1, characterized by the fact that the output responsive means comprises a permanent magnet and a coil winding movable in the field thereof, that the coil winding is provided with a resilient support disposed to carry the weight of the coil winding and the parts by which it is connected to said adjustable force transmitting mechanism, and that the coil winding is provided with a vertical guide and guide bearing to guide the same in its movement relative to said magnet.

References Cited in the file of this patent

UNITED STATES PATENTS

| Number | Name | Date |
| --- | --- | --- |
| 2,053,885 | Weeks | Sept. 8, 1936 |
| 2,352,312 | Donaldson | June 27, 1944 |
| 2,546,657 | Smoot | Mar. 27, 1951 |
| 2,558,184 | Lavet | June 26, 1951 |

OTHER REFERENCES

Electronics Magazine, pages 136, 138, 140, 142, Sept. 1948.